(12) United States Patent
Horrer et al.

(10) Patent No.: US 6,343,325 B1
(45) Date of Patent: *Jan. 29, 2002

(54) METHOD OF ESTABLISHING A CONNECTION, AS WELL AS AN EXCHANGE AND A SERVICE CONTROL POINT

(75) Inventors: Matthias Horrer, Raleigh, NC (US); Lothar Krank; Uwe Stahl, both of Leonberg (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,262

(22) Filed: Sep. 26, 1997

(30) Foreign Application Priority Data

Sep. 28, 1996 (DE) .......................... 196 40 069

(51) Int. Cl.⁷ ............................. G06F 15/173
(52) U.S. Cl. ...................... 709/238; 709/239
(58) Field of Search ................. 379/207, 230, 379/201, 220, 112, 211, 272; 370/524, 352, 522; 709/238, 235, 239, 242

(56) References Cited

U.S. PATENT DOCUMENTS

| | | | | |
|---|---|---|---|---|
| 4,720,850 A | * | 1/1988 | Oberlander et al. | 379/90 |
| 5,259,026 A | | 11/1993 | Johnson | 379/207 |
| 5,423,003 A | * | 6/1995 | Berteau | 395/200 |
| 5,425,090 A | * | 6/1995 | Orriss | 379/201 |
| 5,598,464 A | | 1/1997 | Hess et al. | 379/213 |
| 5,764,745 A | * | 6/1998 | Chan et al. | 379/207 |
| 5,771,284 A | * | 6/1998 | Sonnenberg | 379/220 |
| 5,793,859 A | * | 8/1998 | Matthews | 379/220 |
| 5,835,583 A | * | 11/1998 | Hetz et al. | 379/220 |
| 5,991,817 A | * | 11/1999 | Rowett et al. | 709/250 |

FOREIGN PATENT DOCUMENTS

| | | |
|---|---|---|
| EP | 0708570 | 4/1996 |
| GB | 2270608 | 3/1994 |
| WO | 8802205 | 3/1988 |

OTHER PUBLICATIONS

"Freeing the Network for Competition" by T. Bishop Telecommunications, Dedham, MA, Apr. 1995, pp. 75, 77–78, 80.

"High Level Service Description for Number Portability (Interim Solution)", PNO–IG/N,P/1, PNO–IG Number Portability Task Group, Issue 1, Draft D, Amendment 0, pp. 1–54.

* cited by examiner

Primary Examiner—Glenton B. Burgess
Assistant Examiner—Tod Kupstas
(74) Attorney, Agent, or Firm—Ware, Fressola, Van Der Sluys & Adolphson LLP

(57) ABSTRACT

The invention concerns a method of establishing a connection via a communications network to a called terminal (TE) which is geographically located in the area (AREA) of two or more local line networks (LNA to LNC), as well as an exchange and a service control point for carrying out this establishment of a connection. A calling terminal requests a connection to the called terminal (TE) by means of a call request (CALL(N)) which is provided with a called number (N) assigned to the called terminal (TE). To establish the connection, that of the two or more local line networks (LNA to LNC) via which the called terminal (TE) can be reached, is determined by means of a learning procedure using the called number (N).

15 Claims, 3 Drawing Sheets

METHOD OF ESTABLISHING A CONNECTION, AS WELL AS AN EXCHANGE AND A SERVICE CONTROL POINT

BACKGROUND OF THE INVENTION

1. Technical Field

The invention concerns a method of establishing a connection via a communications network to a called terminal which is geographically located in the area of two or more local line networks, as well as an exchange for a communications network and a service control point for connection to one or to several exchanges of a communications network.

2. Discussion of Related Art

Presently the usual methods of establishing a connection will route a call request to the subscriber station by means of a call number of the called subscriber which is entered therein. In this case the call number provides the path through the communications network and is evaluated step by step along the path through the communications network, i.e. it first addresses for example the local exchange area, then the subscriber's exchange, and then the station of the called subscriber within the numbering range of the subscriber's exchange.

However all of these methods of establishing a connection fail if the local line networks of different network operators share the calling range in a subscriber line area but the requirement for call number portability still remains. In this case call number portability means that a subscriber is able to change local line network operators within his subscriber line area and can take his call number with him to the new network operator. The result is that there is no longer a fixed association between the local line network and the call number of a called subscriber, which can be identified with the call number.

The invention now starts with a method of establishing a connection in a deregulated network environment, as proposed in the report "High level service description for number portability" of the "Public Network Operators—Interest Group", Jun. 29, 1994 as a possible solution for achieving call number portability in the United Kingdom (UK).

Call number portability is achieved by translating the call number by means of call forwarding or by means of an IN service (IN=Intelligent Network). If a subscriber changes from one network operator to a second network operator within a local exchange area and wishes to take his call number with him, call forwarding is installed as a service in the local line network of the first network operator. If this service identifies a call request with this call number, the call request is rerouted to the local line network of the second network operator. This rerouting takes place by entering a new call number into the call request instead of the original call number, which addresses the subscriber as a subscriber of the local line network of the second network operator.

In this case the relocated call number and the local line network to which a call request with this call number is to be routed, must be entered into a data base by the network operator. The call forwarding service is controlled by the data from this data base.

A disadvantage of this solution is that this data base which assists the forwarding service must be continuously updated by the network operator. If the data base updating is delayed, the concerned subscriber can no longer be reached.

Further drawbacks result when the portability of call numbers is demanded to a greater extent and therefore a large number of forwarding services are provided by a communications network. All of these forwarding services must then be synchronized by a master data base. This causes a large expense.

SUMMARY OF INVENTION

The task of the invention is to present an alternative method of establishing a connection in a communications network, to a terminal that is located in the area of two or more local line networks.

According to a first aspect of the invention, a method of establishing a connection through a communications network to a called terminal located in the geographical area of two or more local line networks, wherein a calling terminal requests a connection to the called terminal by means of a call request which is provided with a called number assigned to the called terminal, and wherein that of the two or more local line networks via which the called terminal can be reached is determined for the establishment of the connection, characterized in that the local line network via which the called terminal can be reached is determined by means of a learning procedure using the called number.

According to a second aspect of the invention, an exchange for a communications network with a routing guidance device for controlling the establishment of a connection via the communications network to the called terminal, wherein the routing guidance device is provided with reception means for receiving a call request with a called number assigned to the called terminal, and with control means that are designed so that if the called terminal is assigned to a subscriber line area, and its call number area is shared by two or more local line networks, that of the two or more local line networks via which the called terminal can be reached is determined for the establishment of the connection, characterized in that the control means are designed so that the local line network via which the called terminal can be reached is determined by means of a learning procedure using the called number.

According to a third aspect of the invention, a service control point for connection to one or to several exchanges of a communications network, with a receiving unit for receiving a call request, with a called number assigned to a called terminal, and with control means that are designed so that if the called terminal is assigned to a subscriber line area, and its calling range is shared by two or more local line networks of different network operators, they determine that of the two or more local line networks via which the called terminal can be reached, characterized in that the control means are designed so that the local line network via which the called terminal can be reached is determined by means of a learning procedure using the called number.

The basic idea of the invention is that when a connection is established, the destination local line network is no longer determined on the basis of the numbering plan of the called terminal's call number, but by a learning procedure using the called terminal's call number. In that case the number of the called terminal is generally a very logic address which is addressed by a terminal or by a subscriber assigned to this terminal.

Thus the assignment of the call number of a terminal to a local line network no longer needs to be entered into a data base by the network operator. Nor is any explicit updating of said data base required any longer. Rather the method of establishing a connection provides that the local line network which is assigned to a call number is learned in accordance with the learning procedure.

Further advantages of the invention result when a communications network provides a number of forwarding services. In that case the provision of a central master data base is no longer required. The services learn in a rather decentralized manner the assignment of local line networks to the incoming call numbers they receive. Based on this decentralized learning procedure, the expense of providing a central master data base and the expense of the communication for synchronizing the distributed data bases via the master data base are absent.

Since a central component is omitted, namely the master data base, the invention has increased fail-safety. A failure of the central master data base would affect the entire communications network, while the failure of a learning-capable node only affects one partial network in a large number of partial networks.

However it is also possible to support the learning procedure with a master data base when using the method of establishing a connection according to the invention. This leads to an acceleration of the learning procedure.

Another advantage is that the method of the invention to establish a connection can be directly integrated into the routing guidance of exchanges and thus the cost of introducing this method of establishing a connection is low.

BRIEF DESCRIPTION OF THE DRAWING

The invention is explained in the following by means of two configuration example with the help of the attached drawings, wherein.

DETAILED DESCRIPTION OF PREFERRED EMBODIMENTS

The first configuration example explains the method of the invention to establish a connection in a communications network with one or with several exchanges according to the invention.

Figure 1:
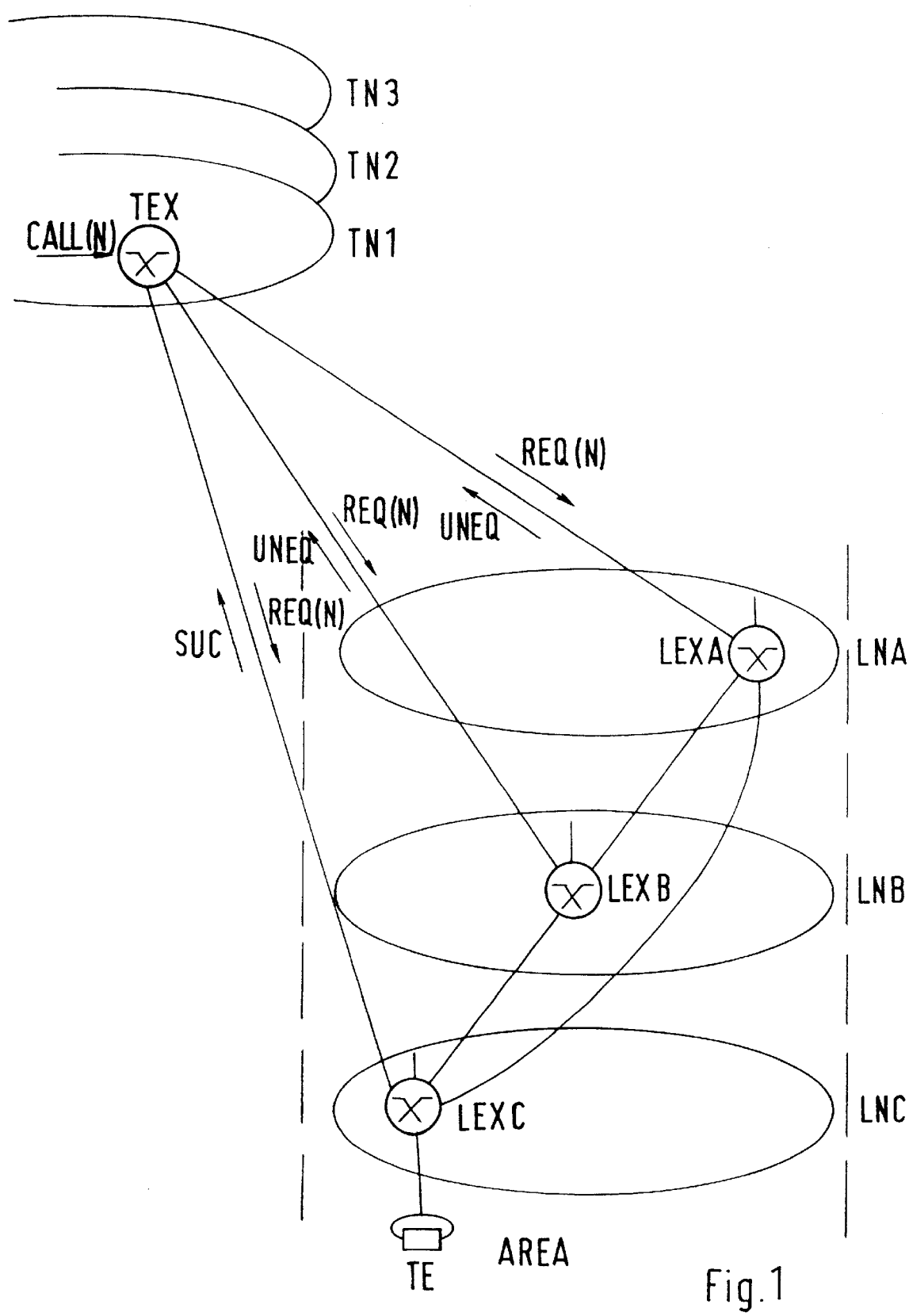
FIG. 1 is a section of a block diagram of a communications network.

FIG. 1 illustrates a section of a communications network with three trunk networks TN1 to TN3, and three local line networks LNA to LNC. The local line networks LNA to LNC connect the terminals of a subscriber line area AREA. Of these connected terminals only terminal TE, which is connected to the local line network LNC, is shown as an example. Of the exchanges of the trunk networks TN1 to TN3 and the local line networks LNA to LNC, four exchanges TEX or LEXA to LEXC are shown as an example.

The trunk networks TN1 to TN3 represent conventional trunk networks which are used to provide telephone communication between exchanges. The trunk networks TN1 to TN3 are respectively connected to the local line networks LNA to LNC of the subscriber line area AREA, so that a connection can be established between the local line networks of different subscriber line areas via each trunk network TN1 to TN3.

It is also possible for the local line networks LNA to LNC to be only connected to one trunk network and in this way there is no possibility of dialing a trunk and therefore a trunk network operator.

The local line networks LNA to LNC are conventional line networks for connecting telephone terminals and private branch exchanges. Possible telephone terminals in that case are telephones and fax machines, but also modems and interface cards for connecting data processing installations. They can be analog as well as ISDN (Integrated Services Digital Network) terminals. The terminal TE is such a terminal.

The local line networks LNA to LNC are made up of one or of several subscriber exchanges. Of these subscriber exchanges either the exchange LEXA, LEXB or LEXC is shown. All the terminals of subscribers assigned to one of the local line networks LNA to LNC are connected via subscriber lines to such a subscriber exchange of the respective local line network. Larger local line networks may also contain transit exchanges because of the increased traffic load. Transverse lines interconnect the exchanges of a local line network and one or several transit exchanges of the trunk networks TN1 to TN3.

It is also possible to interconnect exchanges of the local line networks LNA to LNC by means of transverse lines.

It is also possible that the local line networks LNA to LNC are radio networks, for example according to the GSM (Global System for Mobile Communications) standard, or according to the DECT (Digital Enhanced Cordless Telephone) standard. Such radio interfaces can also be part of one or several exchanges in one of the local line networks LNA to LNC, i.e. only some of the subscribers of this local line network are connected to one or to several radio networks.

The local line networks LNA to LNC are assigned to different network operators. Since they cover the same subscriber line area AREA, for example the same local network area, the local line networks LNA to LNC share the numbering range of the subscriber line area AREA. The local line networks LNA to LNC are therefore available in parallel to each other to the subscribers who reside in the same geographical area under the same local network identity. In this way the subscribers can choose to which local line network LNA to LNC their terminal is connected and by means of this selection determine the local line network operator and thereby the conditions that apply to the subscriber line.

The following describes the layout of a connection from a calling terminal of the communications network to the terminal TE via the trunk network TN1.

The calling terminal sends a call request with a call number N, which identifies the called terminal TE, to the subscriber exchange to which is connected.

It is also possible that the call number N is a logical network address or an address that identifies the called subscriber.

The subscriber exchange routes the call request as a signalling message CALL(N) via the no. 7 signalling system to the trunk network TN1. The trunk network TN1 then routes the signalling message CALL(N) to the exchange TEX representing the transit exchange, whereby the local line networks LNA to LNC are connected to the trunk network.

The routing of the signalling message CALL(N) from exchange to exchange and finally to the exchange TEX is controlled by the routing guidance functions of these exchanges. These routing guidance functions successively evaluate the call number N from exchange to exchange. Thus for example the subscriber exchange determines from the first digits of the dialed number that the signalling message CALL(N) should be routed to the pertinent transit exchange of the trunk network TN1; this transit exchange then determines from the next digit or digits of the call number to which other exchanges of the trunk network the signalling message CALL(N) should be routed, and so forth.

The exchange TEX decides about the further routing of the signalling message CALL(N) in a different way. The exchange to which the signalling message CALL(N) is routed is determined on the basis of a learning procedure. This learning procedure comprises the following steps:

The exchange TEX checks successively which of the local line networks LNA to LNC of the call number N has a terminal assigned to it. To that end it sends a signalling message REQ(N) with the call number N, or the part of the call number N which corresponds to the numbering range of the subscriber line area AREA, one at a time respectively to an exchange of the local line networks LNA to LNC, for example first to the exchange LEXA, secondly to the exchange LEXB and thirdly to the exchange LEXC.

It is also possible to send the signalling message REQ(N) in parallel to these exchanges.

After it receives the signalling message REQ(N), the respective exchange LEXA, LEXB or LEXC checks in each case whether or not a subscriber line with the call number N is present in the local line network LNA, LNB or LNC, and then sends a return message containing this information back to the exchange TEX. By evaluating these received return messages, the learning procedure obtains the information to which of the local line networks LNA to LNC of the subscriber line area AREA it must route the signalling message CALL(N), i.e. via which of the local line networks LNA to LNC the connection to the terminal TE should be established.

The signalling message REQ(N) is the call request to establish a connection in accordance with the no. 7 signalling system. This has the advantage that the call request no longer needs to be additionally sent to this exchange. It is however possible for this message to be one that is specified for this function proper, which is also transmitted via the no. 7 signalling system.

The signalling message REQ(N) is processed in the local line networks LNA to LNC as follows:

For example if the exchange LEXA is the only exchange of the local line network LNA, all the subscriber lines of this network are connected thereto and its routing guidance contains a list defining which call number is assigned to what exchange. To check, it searches this list and recognizes if the part of the call number N that corresponds to the numbering range of the subscriber line area AREA is not listed as a call number in the list. In that case it sends a return message UNEQ to the exchange TEX. The return message UNEQ is sent to the exchange TEX as the no. 7 message via the no. 7 signalling system in this case.

For example if the exchange LEXB is one of several exchanges in the local line network LNA, the exchange LEXB, like the exchange LEXA, checks whether a subscriber line with the call number N is available therein. If this is not the case, it routes the call request CALL(N) to this or to one of the other exchanges in the local line network LNB. This other exchange then performs an analog check.

The selection of the exchange to which the exchange LEXB routes the call request can be made on the basis of a numbering plan. In that case the selection is made based on an assignment of a predetermined frontal sequence of digits in the call number N as the sequence of digits which identifies a predetermined exchange in the local line network LNB.

A second possibility is that the exchange LEXB has a list defining which of the call numbers in the local line network LNB is assigned to which one of the subscriber lines in the local line network LNB. In that case it is also possible for the check to be performed by the exchange LEXB alone by evaluating this list.

A third possibility is that the exchange LEXB performs a learning procedure that is analogous to that carried out by the exchange TEX, and by means of this learning procedure prepares a list that defines which call number is assigned to which one of the exchanges in the local line network LEXB.

It is also possible for each or several of the exchanges in the local line network LNB to have a connection to the exchange TEX. In that case the exchange TEX would successively send the call request REQ(N) to these exchanges. Upon receiving this request, the individual exchanges would perform a check that is analogous to the check performed by the exchanges LNA or LNB.

The terminal TE is also not connected via the local line network LNB, and thus a return message UNEQ is also sent to the exchange TEX by the exchange LEXB.

The exchange LEXC knows that a terminal with the call number N is connected to it, namely the terminal TE. This way after receiving the signalling message REQ(N) it sends a return message SUC to the exchange TEX. In this case the return message SUC is sent as the no. 7 message via the no. 7 signalling system.

Sending back the return message SUC could also be omitted. The lack of a return message, which is diagnosed for example after a timer has run out, can be used as the sign that the called terminal is connected through the local line network LNC.

By sending a return message SUC, the exchange LEXC routes a call to the terminal TE. If the subscriber lifts the receiver of terminal TE, the exchange LEXC causes a connection to be established backwards between the terminal TE and the calling terminal in accordance with the path laid by the call request CALL(N) through the communications network from the calling to the called terminal.

It is also possible for a user information channel to be switched one by one through the communications network parallel to routing the call request CALL(N) further through the communications network, i.e. the connection is made in parallel and in accordance with the call request CALL(N).

During the establishment of the connection it is also possible for other or further exchanges of the communications network to determine the exchange to which they are routing a call request in accordance with the method performed by the exchange TEX. All of these exchanges face the problem that the call request is addressed to a terminal in the subscriber line area AREA and that they must determine via which one of the local line networks LNA to LNC a connection to this terminal should be established. Such exchanges could for example be exchanges of the local line networks LNA to LNC, which are connected via a transverse line to one or to several exchanges of one or several of the other local line networks LNA to LNC, and thus participate in the establishment of a connection between the terminals that are connected to different local line networks LNA to LNC.

Figure 2:
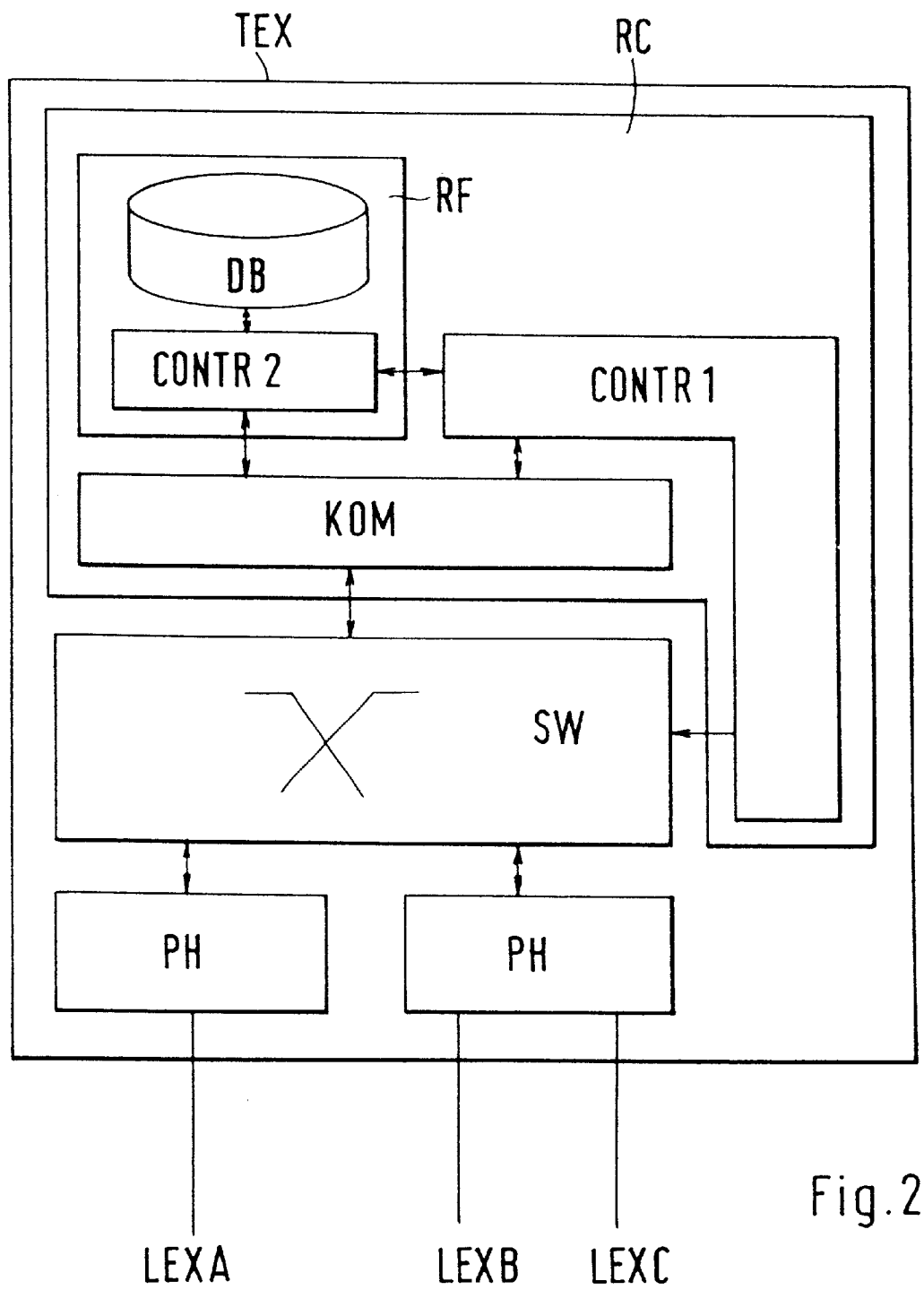
FIG. 2 is a block diagram of an exchange according to the invention for a first configuration example.

The detailed performance of the learning procedure during the establishment of the connection will now be explained by means of FIG. 2. FIG. 2 illustrates the exchange TEX with two attachment units PH, a switching network SW and a controller RC which is responsible for the routing guidance.

The attachment units PH provide functions that enable the subscriber line connection of terminals and particularly the connection of transverse line bundles to other exchanges. For example the exchanges LEXA to LEXC are connected through the attachment units PH to the exchange TEX by means of transverse line bundles.

The attachment units PH and the controller RC exchange data via the switching network SW. The controller RC controls the switching network SW. It contains a communications unit KOM and two control units RF and CONTR1.

The communications unit KOM contains the necessary functional hardware and software groups which are required to receive and send signalling messages via the switching network SW. These functional groups in particular enable the reception of the call request CALL(N) and the return messages SUC and UNEQ, and sending the signalling message REQ(N).

The control units CONTR1 and RF comprise control programs which run on the data processing platform of the exchange TEX. In this case the control unit RF is responsible for controlling the learning procedure, and the control unit CONTR1 is responsible for the remaining part of controlling the establishment of a connection via the exchange TEX.

If the control unit CONTR1 receives a call request, for example the call request CALL(N), it determines from the call number contained in the call request whether the request is addressed to a terminal of the subscriber line area AREA, and therefore the local line network via which this terminal can be reached must be determined. If this is the case, a message is sent to the control unit RF which then determines this local line network and causes the establishment of the further connection through this local line network via the control unit CONTR1.

The control unit RF contains a control logic CONTR2 and a data base DB.

The control logic CONTR2 controls sending the signalling messages REQ(N) in accordance with the method described by FIG. 1. If the control logic CONTR2 receives a positive return message SUC, it stops the further sending of signalling messages REQ(N) to exchanges of the still remaining local line networks. In this case the sequence whereby the signalling messages REQ(N) are sent to the exchanges of the local line networks can be randomly selected, or it can be specified for all call requests.

It is advantageous to determine these sequences by statistically evaluating the attempts to establish a connection to terminals of the subscriber line area. For example a signalling message REQ(N) is first sent to an exchange of the local line network via which most of the connections are established, etc. The sequence can be adaptively fitted to the subscriber response by continuously and statistically evaluating the attempts to establish a connection to the terminals of the subscriber line area.

It is also possible for the signalling message REQ(N) to be sent to the local line network via which most of the connections are established and, if this attempt is not successful, the signalling message REQ(N) is then sent in parallel to all the remaining local line networks.

Data concerning the assignment of call numbers to local line networks of the subscriber line area AREA are stored in the data base DB. While the connection is being established, if the learning procedure determines by means of the above described method the particular local line network via which a terminal with a predetermined call number is connected, this call number and this local line network are stored as an assignment in the data base DB. When the learning procedure is being performed, the data base DB is first searched to determine whether it already stores an assignment of a local line network to the call number contained in the call request. If this is the case, the assignment is used to establish the connection. If this assignment is no longer correct, for example because a subscriber has changed his local line network operator, this is determined upon reception of the return message UNEQ. In that case the learning procedure is performed as described earlier, i.e. successive signalling messages REQ(N) are sent out.

It is also possible to omit the data base DB and to perform the learning procedure solely by sending out the signalling messages REQ(N) and by receiving the return messages SUC and UNEQ. But using the data base DB has the advantage of lessening the signal load on the communications network.

It is furthermore possible to provide the assignments with a time stamp and to delete an assignment from the data base DB after it has not been requested for a long period of time, or it has been stored in the data base DB for a long period of time. The deletion or the input of an assignment in the data base DB could also be a function of the frequency of the assignment requests. When such deleting strategies are used, the required storage space of the data base DB can be considerably reduced without significantly increasing the signal load on the communications network.

A further possibility is for the control logic CONTR2 to also have access to a master data base while the learning procedure is being performed. Network-wide there could be one or even several of such master data bases. In that case it is an advantage to provide a master data base for locally adjacent exchanges TEX.

An access to this master data base takes place for example if no input or no valid input of a call number can be found in the data base DB, and the local line network cannot be found after one or several signalling messages REQ(N) have been sent out. If no assignment or no valid assignment is stored in the master data base either, sending the remaining signalling messages continues. If an assignment is subsequently determined, it is entered into the data base DB and into the master data base.

The second configuration example explains the performance of the method of the invention to establish a connection in a communications network with one or several service control points of the invention.

In the second configuration example the establishment of a connection is performed as in FIG. 1, with the difference that the exchange TEX is replaced by a service switching point SSP and a service control point SCP.

Figure 3:
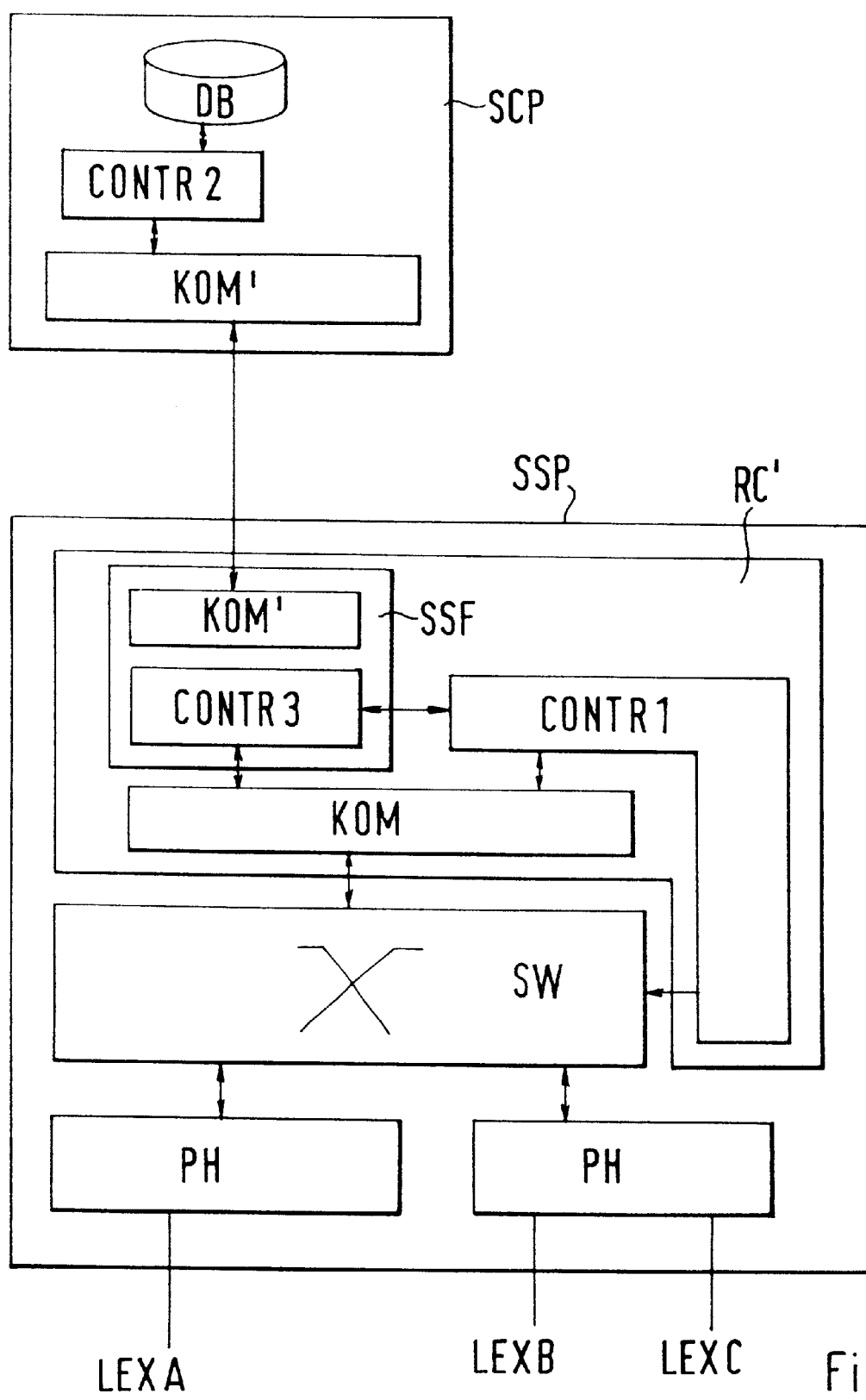
FIG. 3 is a block diagram of an exchange and a service control point according to the invention for a second configuration example.

FIG. 3 illustrates the service switching point SSP and the service control point SCP which communicate with each other, for example in accordance with the IN architecture (IN=Intelligent Network).

It is also possible for two or more service switching points SSP to have access to the service control point SCP and in this way to centrally control the method of the invention to establish a connection in several exchanges by means of the service control point SCP.

The service control point comprises the attachment units PH, the switching network SW and a controller RC' which comprises the control unit CONTR1, the communications unit KOM and a control unit SSF.

The attachment units PH, the switching network SW, the control unit CONTR1 and the communications unit KOM are designed in accordance with FIG. 2.

The control unit SSF is used to link the service control point SCP with the controller RC'. It contains a control logic CONTR3 and a communications unit KOM'.

The communications unit KOM' provides the necessary communication services for communication with the service control point SCP via the no. 7 signalling network or via any other data network, for example a X.25 packet network.

The control logic CONTR3 works together with the control unit CONTR1 and with the communications unit KOM like the control logic CONTR2 in FIG. 2, with the difference that the actual control functions are provided by the service control point SCP.

The service control point SCP also contains the communications unit KOM', the control logic CONTR2 and the data base DB. Beyond that it also contains functional groups that work together with the control logic CONTR3 and CONTR2, and enable control by means of the control logic CONTR2 of a method of establishing a connection which is carried out via the controller RC'. These functional groups, the control logic CONTR3 and the communications unit KOM' can work together in accordance with the IN architecture for example.

The control logic CONTR2 and the data base DB are configured as shown in FIG. 2. Thus the establishment of a connection is made in accordance with FIG. 1 and FIG. 2, with the difference that the learning procedure is performed by functional groups of the service control point SCP.

What is claimed is:

1. A method of establishing a call connection, through one of a plurality of exchanges (TEX) in a communications network, to a called terminal (TE) specified by a calling terminal and located in the geographical area (AREA) of a plurality of local line networks (LNA to LNC), each line network comprising one or more subscriber exchanges (LEXA to LEXC), wherein the calling terminal requests the call connection to the specified called terminal (TE) by means of a call request (CALL(N)) which is provided with a called number (N) assigned to the specified called terminal (TE), and wherein which of the plurality of local line networks (LNA to LNC) must be used to reach the specified called terminal (TE) is determined for the establishment of the connection, characterized in that:

the local line network (LNC) via which the specified called terminal (TE) can be reached is determined by means of a learning procedure using the called number (N), wherein the learning procedure includes sending signaling messages (REQ(N)) to the subscriber exchanges (LEXA to LEXC) of the plurality of local line networks (LNA to LNC), wherein the signaling messages (REQ(N)) are sent to the subscriber exchanges (LEXA to LEXC) of the plurality of local line networks (LNA to LNC) in a sequence which is adaptively fitted to a subscriber response by continuously and statistically evaluating attempts to establish a connection to the specified called terminal (TE) of the geographical area (AREA), and wherein each of the plurality of local line networks (LNA, LNB) provides a return message (UNEQ) to said one exchange (TEX), in response to the signaling messages (REQ(N)), if the call connection must be established via another local line network due to the fact that no terminal is assigned to the call number (N) in the local line network (LNA, LNB) providing the return message.

2. A method as claimed in claim 1, characterized in that the two or more local line networks (LNA to LNC) form a subscriber line area (AREA) having a common number range, with the two or more local line networks (LNA to LNC) sharing said common number range.

3. A method as claimed in claim 1, characterized in that the two or more local line networks (LNA to LNC) are operated by different network operators.

4. A method as claimed in claim 1, characterized in that the learning procedure involves checking successively whether in the local line networks (LNA to LNC) a terminal is assigned to the called number (N).

5. A method as claimed in claim 4, characterized in that if the check is positive, the checked local line network (LNC) is determined as the local line network in which a terminal is assigned to the called number.

6. A method as claimed in claim 4, characterized in that if the check is positive, the called number (N) and, in association therewith, the checked local line network (LNC) are stored in a database (DB).

7. A method as claimed in claim 4, characterized in that in the learning procedure, the database (DB) is first searched to determine whether the called number (N) is stored therein together with an associated subscriber line network.

8. A method as claimed in claim 1, characterized in that the learning procedure is controlled by an IN service.

9. A method as claimed in claim 1, characterized in that the learning procedure is controlled by the routing guidance (RC) of an exchange (TEX).

10. A method as claimed in claim 1, characterized in that the sequence whereby the signaling messages (REQ(N)) are sent to the subscriber exchanges (LEXA to LEXC) of the local line networks (LNA to LNC) is randomly selected.

11. A method as claimed in claim 1, characterized in that in response to the signaling message (REQ(N)), the respective local line network (LNC) provides a return message (SUC) if a terminal is assigned to the called number (N) in the respective local line network (LNC).

12. A method as claimed in claim 11, characterized in that for the check, messages (REQ(N), UNEQ, SUC) are exchanged with one or more of the local line networks (LNA to LNC) via the no. 7 signaling system.

13. An exchange (TEX) for a communications network with a routing guidance device (RC) for controlling the establishment of a call connection via the communications network to a called terminal (TE) specified by a calling terminal, wherein the routing guidance device (RC) is provided with reception means (KOM) for receiving a call request (CALL(N)) with a called number (N) assigned to the specified called terminal (TE), and with control means (RF, CONTR1) that are designed so that if the specified called terminal (TE) is assigned to a subscriber line area (AREA), and the specified called terminal has a call number area which is shared by two or more local line networks (LNA to LNC), and each line network comprises one or more subscriber exchanges (LEXA to LEXC), then which of the plurality of local line networks (LNC) must be used to reach the specified called terminal (TE) is determined for the establishment of the call connection, characterized in that:

the control means (RF, CONTR1) are designed so that the local line network LNC via which the specified called terminal (TE) can be reached is determined by means of a learning procedure using the called number (N), wherein the learning procedure includes sending signaling messages (REQ(N) to the subscriber exchanges (LEXA to LEXC) of the local line networks (LNA to LNC), wherein the signaling messages (REQ(N)) sent to the subscriber exchanges (LEXA to LEXC) of the local line networks (LNA to LNC) have a sequence which is adaptively fitted to a subscriber response by continuously and statistically evaluating attempts to establish a connection to the specified called terminal (TE) of the geographical area (AREA), and wherein each of the plurality of the local line networks (LNA, LNB) provides a return message (UNEQ) to said exchange (TEX) in response to the signaling messages (REQ(N)) if the call connection must be established via another local line network due to the fact that no terminal is assigned to the call number (N) in the local line network (LNA, LNB) providing the return message.

14. An exchange (TEX) as claimed in claim 13, characterized in that the exchange (TEX) is located in the communications network at the transition point between the remote and the local network plane.

15. A service control point (SCP) for making a call connection to one of several exchanges (TEX) of a communications network, with a receiving unit (KOM') for receiving a call request (CALL(N)), with a called number (N) assigned to a called terminal (TE) specified by a calling terminal, and with control means (CONTR2, DB) that are designed so that if the specified called terminal (TE) is assigned to a subscriber line area (AREA) and has a calling range shared by a plurality of local line networks (LNA to LNC) of different network operators, and if each line network comprises at least one subscriber exchange (LEXA to LEXC), then the control means (CONTR2, DB) determine which of the plurality of local line networks (LNC) must be used to reach the specified called terminal (TE), characterized in that:

the control means (CONTR2, DB) are designed so that the local line network (LNC) via which the specified called terminal (TE) can be reached is determined by means of a learning procedure using the called number (N), wherein the learning procedure includes sending signaling messages (REQ(N)) to the subscriber exchanges (LEXA to LEXC) of the local line networks (LNA to LNC), and the signaling messages (REQ(N)) are sent to the subscriber exchanges (LEXA to LEXC) of the local line networks (LNA to LNC) in a sequence which is adaptively fitted to a subscriber response by continuously and statistically evaluating attempts to establish a connection to the specified called terminal (TE) of the geographical area (AREA), and wherein each of the plurality of local line networks (LNA, LNB) provides a return message (UNEQ) to said plurality of exchanges (TEX) in response to the signaling messages (REQ(N)) if the call connection must be established via another local line network due to the fact that no terminal is assigned to the call number (N) in the local line network (LNA, LNB) providing the return message.

* * * * *

UNITED STATES PATENT AND TRADEMARK OFFICE
CERTIFICATE OF CORRECTION

PATENT NO. : 6,343,325 B1
DATED : January 29, 2002
INVENTOR(S) : Horrer et al.

It is certified that error appears in the above-identified patent and that said Letters Patent is hereby corrected as shown below:

Column 11,
Line 2, please delete "LNC)" and substitute therefor -- (LNC) --.
Line 7, please delete "(REQ(N)" and substitute therefor -- (REQ(N)) --.

Signed and Sealed this

Twenty-third Day of April, 2002

Attest:

JAMES E. ROGAN
*Attesting Officer*     *Director of the United States Patent and Trademark Office*